United States Patent [19]

Neri

[11] Patent Number: 4,551,333

[45] Date of Patent: Nov. 5, 1985

[54] METHOD OF PRODUCING FREEZE DRIED FISH EGGS

[76] Inventor: Michael A. Neri, 48 Flatt Rd., Rochester, N.Y. 14623

[21] Appl. No.: 493,960

[22] Filed: May 12, 1983

[51] Int. Cl.$^4$ .......................... A23L 1/325; A23C 1/08
[52] U.S. Cl. .......................................... 426/1; 426/385
[58] Field of Search ................. 426/1, 805, 385; 34/5, 34/92

[56] References Cited

U.S. PATENT DOCUMENTS

| | | | |
|---|---|---|---|
| 3,361,566 | 1/1968 | Axelrod | 426/1 |
| 3,528,816 | 9/1970 | Nagae | 426/1 |
| 3,876,803 | 4/1975 | Stephan et al. | 426/1 |
| 3,931,414 | 1/1976 | Popeil | 426/1 |

OTHER PUBLICATIONS

Komavik et al., Food Products Formulary, vol. 1, The AVI Publishing Co., Inc., Westport, Conn., 1974, (pp.330–331).

*Primary Examiner*—George Yeung
*Attorney, Agent, or Firm*—Shlesinger, Fitzsimmons & Shlesinger

[57] ABSTRACT

Mature eggs from a female fish, such as a trout or salmon, are separated from the surrounding tissue or membrane material which normally holds them in clusters. The eggs are rinsed in warm water and placed in spaced relation on a suitably waxed substrate or the like, which will not cling to the separated eggs when they are frozen. The substrate is then placed in a freezer where the eggs are frozen as rapidly as possible, after which they are placed in the vacuum chamber of a sublimation or freeze drying device, which maintains the eggs under a vacuum and at a freezing temperature (e.g. 10° F.) for a period of time (e.g. three days) sufficient to cause all moisture to be sublimed or removed from the eggs. The resultant freeze dried eggs have hard outer shells and white, granular, opaque interiors. The eggs can exist indefinitely in the atmosphere at room temperature and require no special storing procedures. When placed in water they rehydrate and float just beneath the surface of the water where they are are most attractive to fish.

4 Claims, 3 Drawing Figures

METHOD OF PRODUCING FREEZE DRIED FISH EGGS

BACKGROUND OF THE INVENTION

This invention relates to an improved bait for use in fishing, and more particularly to a novel freeze dried bait. Even more particularly, this invention relates to freeze dried fish eggs and a method of producing same.

It has long been recognized by avid fishermen that fish eggs (eggs from a female fish) make excellent bait for at least certain types of fish. Salmon eggs, for example, are known to be excellent bait for catching trout. One of the problems with using salmon eggs, however, is that their life expectancy is very short unless they are properly refrigerated. The eggs can be kept for longer periods of time if they are frozen solid, and for still longer periods if they are kept in a pickle solution. In either of these three forms (fresh, frozen or pickled), however, the eggs require a considerable amount of care and are difficult to store.

At the time that they are used, small groups of eggs of the type described are usually enclosed in small pieces of fine gauze or netting. The netting can then be used for securing clusters of the eggs to a fish hook. When the eggs are fresh they are extremely moist and slimy, which makes it extremely difficult to secure them in small pieces of netting. Even if frozen, the eggs must be thawed and returned to their moist, slimy state before they can be secured in netting. Pickled eggs have essentially the same moist consistency as fresh eggs, and therefore offer the same difficulties in netting.

Still another disadvantage of fresh, frozen or pickled eggs of the type described is that they are relatively dense, and tend rather quickly to settle to the bottom of a stream or body of water when used as bait, unless the associated fishing line is bouyed by a bobber or the like to keep the bait from settling. While the use of pickled eggs has solved the problem of spoilage, the fact remains that pickled eggs simply are not as effective a bait as fresh or frozen eggs.

It is an object of this invention, therefore, to provide an improved fishing bait in the form of a dry, bouyant fish egg, which is considerably easier to store and handle than fresh, frozen or pickled fish eggs.

A more specific object of this invention is to provide an improved fishing bait in the form of freeze dried fish eggs, which can be readily stored in dry form in almost any environment, and which will readily rehydrate upon being placed in water.

Another object of this invention is to provide a novel process for producing freeze dried fish eggs that are particularly suitable for use as fish bait.

Other objects of the invention will be apparent hereinafter from the specification and from the recital of the appended claims, particularly when read in conjunction with the accompanying drawing.

SUMMARY OF THE INVENTION

Eggs are removed from a mature, female fish, such as a trout or salmon, and are separated from the tissue casing that normally retains the eggs in clusters. The eggs are then placed in spaced relation on a plastic substrate, or the like and are frozen as quickly as possible. After being frozen the eggs are placed in a vacuum chamber where they are sublimated at a temperature well below freezing. The operation continues until the eggs are completely dried, at which time instead of being transparent they have an opaque, milky white appearance.

When the process has been completed, the processed eggs will have a hard, outer shell, will be light and dry to the touch, and can be stored in any convenient container at room temperature or above. The eggs will remain in this physical state until subsequently reintroduced into water, at which time they will rehydrate. Upon rehydration the eggs have a waxy interior surrounded by a soft membrane, and appear to be far less dense than the fresh, untreated eggs. As a consequence the rehydrated eggs are bouyant and therefore tend to float in water when used as bait.

THE DRAWING

DETAILED DESCRIPTION OF THE PREFERRED EMBODIMENTS

Figure 1:
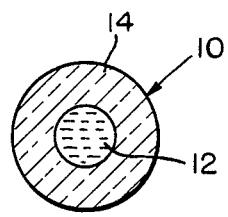
FIG. 1 is a diagramatic sectional veiw on an enlarged scale through the center of a conventional fish egg as it would appear when fresh, it being understood that the view is intended merely to illustrate the basic structural differences between the inner and outer portions of the egg, as distinguished from its precise construction.
Figure 2:
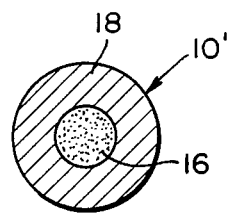
FIG. 2 is a view similar to FIG. 1, but showing such an egg after it has been freezed dried in accordance with the teachings of this invention.

Referring now to the drawing, and first to FIG. 1, 10 denotes generally the approximate appearance of a conventional, fresh salmon egg as it appears in section. It comprises a nearly transparent liquid center 12 surrounded by a transparent membrane 14, which is moist and slimy to the touch. In FIG. 2, 10' denotes the same egg after it has been freezed dried in accordance with the teachings of this invention. The freeze dried egg 10' comprises a granular center 16 having the appearance of a white powder, and which is surrounded by a hard, white shell 18. The freeze dried egg is firm, dry and lighter in weight than the fresh egg 10.

Figure 3:
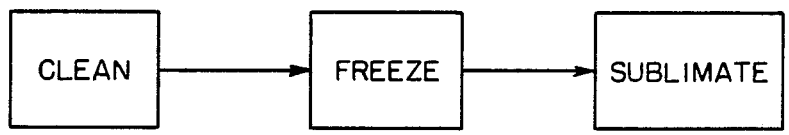
FIG. 3 is a diagramatic view of the steps followed in producing freeze dried eggs in accordance with one embodiment of this invention.

FIG. 3 denotes diagramatically the three successive operations which are formed upon the raw fish eggs in order to produce freeze dried eggs of the type denoted by numeral 10'. At the outset the eggs are obtained from mature female fish, for example trout or salmon; the eggs being as nearly as possible to full maturity. The reason for this is that immature eggs generally will not give the most desirable results, because they tend to retard the rate of moisture absorption which occurs at the time that the freeze dried eggs are subsequently rehydrated.

The raw eggs are first separated from the tissue or casing which normally holds them together in clusters. This must be done very carefully to avoid breaking or penetrating the delicate membrane (14) which surrounds the liquidous center (12) of each egg. After separation from the surrounding tissue, the eggs are rinsed in warm water and carefully strained to clear away any unwanted residue and salts from around the outsides of the eggs. This enhances the rate at which the eggs will sublimate during the subsequent sublimation step. The separated eggs are then deposited in a single layer, and in carefully spaced relation on the surface of a plastic or waxed substrate, which during the subsequent freezing operation will not cling or freeze to the outer surfaces of the eggs.

After cleaning and separation, and while still on the substrate, the eggs are placed in a freezer and are completely frozen as quickly as possible in order to form tiny ice crystals in the eggs. The smaller the ice crystals, the faster they will sublimate.

The frozen eggs are thereafter placed in the evaporation chamber of a conventional freeze drier or sublimation device, for example such as that sold by Vertis Freeze Dry Corporation of Gardner, New York under the trademark "FREEZEMOBILE". This unit comprises a vacuum or evaporation chamber surrounded by a freezer, which maintains the interior of the vacuum chamber at a temperature low enough to keep the eggs frozen. By way of example, during the sublimation process the freezer section of this unit is maintained at a temperature of approximately 10° F., and the vacuum chamber is maintained at a vacuum of approximately 30" Hg. The frozen eggs are maintained in this atmosphere for approximately three days. Upon removal they have the characteristics of the freeze dried egg 10′, which was discussed above.

Other types of sublimating equipment can be employed, and in such cases the rate of sublimation may differ from that described above. Information relating to the characteristics of various sublimating devices of this type can be obtained from publications authored by Doctor Roland Hower, and published by the Smithsonian Institute, Washington, D.C.

One of the unexpected results which occurs when fish eggs of the type described are freeze dried as noted above, is that not only does the outer surface of each egg become hard and dry, but also the inside of the egg is transformed into a generally granular or powder state. As a result, when the eggs are placed in water for use as bait, the outer, hard shell or membrane absorbs water and softens, but does not return to its clear, transparent form (14) Moreover, the granular substance (16) within the membrane turns to a soft, white, waxy substance which is opaque, and which compresses under pressure.

Furthermore, unlike a raw or fresh fish egg, which tends to sink in water, the freeze dried egg 10′, when placed in water, tends to drop just beneath the surface of the water and remain there, presumably because of the bouyancy afforded it by its waxy center. This contrasts with most solid or granulated materials which have been sublimated or freeze dried. Such items when placed in water have a tendency to rehydrate, so that they momentarily float on the surface of the water, but then rapidly settle to the bottom of the water.

It should be noted also that not all fish eggs produce satisfactory bait when subjected to this process. Perch eggs, for example, have been freeze dried in accordance with this process, but upon being rehydrated they tend immediately to sink to the bottom of the associated body of water rather than remaining afloat. The reason for this is believed to be that the perch eggs are too small, and therefore are not capable of forming a bouyant center of the type which occurs in rehydrated salmon or trout eggs of the type disclosed herein, which typically may have a diameter of approximately one quarter of an inch. The perch eggs, on the other hand, are substantially smaller in diameter.

From the foregoing, it will be apparent that the present invention provides a novel freeze dried fish egg-type bait, which obviates many of the disadvantages heretofore associated with fresh or pickled fish egg bait. Unlike the fish eggs presently employed, applicant's novel eggs are perfectly dry and hard before rehydration, and therefore can be readily stored or kept in almost any environment prior to their use. Fresh fish eggs, on the other hand, must be kept refrigerated or frozen, while pickled eggs must be maintained in a special brine solution. Moreover, applicant's novel eggs have the advantage that, when they are placed in water, they absorb enough moisture to soften the outside of the egg, but without destroying the bouyancy of its center, whereby the rehydrated egg tends to float in the water, usually just beneath its surface. Experience suggests that this is the most desirable location of the bait, particularly when fishing for trout.

While this invention has been described in detail in connection with the preparation of freeze dried salmon or trout eggs, it will be apparent that eggs from other fish may likewise be freeze dried and used for bait, without departing from this invention. However, the effectiveness of other such bait will, of course, depend to a great deal upon the size and composition of the rehydrated egg.

Moreover, it will be apparent that this invention is capable of still further modification, and that this application is intended to cover any such modifications as may fall within the scope of one skilled in the art or the appended claims.

What I claim is:

1. A method for producing a dry, rehydratable fish egg for use as fishing bait, comprising
procuring a supply of fresh, raw fish eggs from a female fish,
carefully separating said eggs from each other and from the tissue which normally holds them in clusters,
cleaning the separated eggs to rinse away therefrom unwanted residues and salts,
freezing said eggs while maintaining the eggs in spaced, separated relation to each other in a single layer on a substrate having a surface which prevents the eggs from becoming attached by freezing to the substrate, and
subjecting said separated frozen eggs to a sublimation process in a vacuum chamber to remove substantially all moisture therefrom.

2. A method as defined in claim 1, wherein said sublimation process includes placing said frozen eggs in a chamber maintained at a vacuum of approximately 30 inches of Hg, and at a temperature of approximately 10° F.

3. A method as defined in claim 2, including keeping said eggs in said chamber for approximately three days.

4. A method as defined in claim 3, wherein said eggs are procured from a group consisting essentially of trout and salmon eggs.

* * * * *